United States Patent
Davidsson et al.

(10) Patent No.: US 7,353,461 B2
(45) Date of Patent: *Apr. 1, 2008

(54) METHOD AND APPARATUS FOR SELECTION CONTROL

(75) Inventors: Marcus Davidsson, Linköping (SE); Charlotta Wilstedt, Malmö (SE)

(73) Assignee: Nokia Corporation, Espoo (FI)

( * ) Notice: Subject to any disclaimer, the term of this patent is extended or adjusted under 35 U.S.C. 154(b) by 734 days.

This patent is subject to a terminal disclaimer.

(21) Appl. No.: 10/311,894

(22) PCT Filed: Jun. 26, 2001

(86) PCT No.: PCT/SE01/01463

§ 371 (c)(1),
(2), (4) Date: Apr. 29, 2003

(87) PCT Pub. No.: WO02/01337

PCT Pub. Date: Jan. 3, 2002

(65) Prior Publication Data

US 2003/0169302 A1    Sep. 11, 2003

(30) Foreign Application Priority Data

Jun. 30, 2000    (SE) .................... 0002472

(51) Int. Cl.
*G06F 3/00* (2006.01)
(52) U.S. Cl. ..................... 715/810; 715/787; 715/790; 715/767; 715/794; 715/765
(58) Field of Classification Search ............. 715/810, 715/787, 790, 767, 794, 783, 720, 765
See application file for complete search history.

(56) References Cited

U.S. PATENT DOCUMENTS

| 5,059,965 | A | * | 10/1991 | Geiser ................ 340/995.23 |
| 5,880,768 | A | * | 3/1999 | Lemmons et al. ............ 725/41 |
| 5,956,025 | A | * | 9/1999 | Goulden et al. ............ 715/716 |
| 6,538,672 | B1 | * | 3/2003 | Dobbelaar .................. 715/810 |
| 6,690,391 | B1 | * | 2/2004 | Proehl et al. ............... 715/720 |
| 6,701,525 | B1 | * | 3/2004 | Neervoort et al. ............ 725/38 |
| 6,857,128 | B1 | * | 2/2005 | Borden et al. ................ 725/39 |

FOREIGN PATENT DOCUMENTS

| EP | 0 872 994 | 10/1998 |
| GB | 2 329 813 | 3/1999 |
| WO | 99/60470 | 11/1999 |

* cited by examiner

*Primary Examiner*—Sy Luu
*Assistant Examiner*—Ryan F Pitaro
(74) *Attorney, Agent, or Firm*—Banner & Witcoff, Ltd.

(57) ABSTRACT

The present invention provides a method and apparatus for selection control using a touch screen, wherein first and second intersecting bars (1, 2) are displayed, preferably near the edge, on the screen (3), and the first bar (1) displays containers (4) and the second bar (2) displays objects (5) contained in one of said containers (4); and an object in the second bar (2) is activated by one touch on said object, or objects displayed in the second bar (2) are replaced by objects contained in a selected container by one touch on said selected container in the first bar (1).

26 Claims, 4 Drawing Sheets

METHOD AND APPARATUS FOR SELECTION CONTROL

FIELD OF INVENTION

The present invention generally relates to selection control and particularly to a method and an apparatus for selection control using a touch screen.

BACKGROUND

Today it is expected that everybody can cope with the growing number of services, TV channels, Internet homepages, and the like, and with the growing number of technical apparatuses with increasing number of features.

Selection of services, selection of Internet homepages, selection of TV channels, adjustment of TV, adjustment of set-top box, and the like are usually connected with a lot of key-pressing and there is often information covering an entire display area.

Instructions to adjustment of TV sets and the like are often complex and difficult to understand, and the number of TV channels, etc. is often large.

SUMMARY OF THE INVENTION

It is an object of the present invention to provide a method that facilitate for users to select services and the like, or that facilitate adjustment of TV sets and the like.

This and other objects are according to one aspect of the present invention attained by a method as claimed in claim 1.

A further object of the present invention is to provide an apparatus that facilitate for users to select services and the like or to facilitate adjustment of TV sets and the like.

This object is according to a second aspect of the present invention attained by an apparatus as claimed in claim 14.

A yet further object of the present invention is to provide a computer program product that facilitate for users to select services and the like or to facilitate adjustment of TV sets and the like.

This object is according to a third aspect of the present invention attained by a computer program product as claimed in claim 25.

A still further object of the present invention is to provide a portable media browsing device that facilitate for users to select services and the like or to facilitate adjustment of TV sets and the like.

This object is according to a fourth aspect of the present invention attained by a portable media browsing device as claimed in claim 26.

A touch screen is an apparatus that provides possibilities to develop user interfaces for selection of multiple choices. It can detect an area of the screen touched and relate that area to an object displayed on the screen.

In the present invention two intersected bars are displayed on a touch screen. The bars are preferably displayed near the edge of the screen to block as little as possible of the screen, as the screen still shows an event. The first bar displays a row of containers, each containing objects. The second bar displays a column of objects contained in one selected container, preferably the one located in the intersection of the bars. One touch on an object activates said object, and one touch on a container changes the positions of the containers in said first bar so that the touched container is put in the intersection of the bars and therewith the second bar displays the objects contained in the touched container.

More advantages and features of the present invention will be apparent from the description below.

BRIEF DESCRIPTION OF THE DRAWINGS

The present invention will become more fully understood from the detailed description of embodiments of the present invention given below and the accompanying figures, which are given by way of illustration only, and thus are not limitative of the present invention, wherein.

DETAILED DESCRIPTION OF EMBODIMENTS

In the following description, for purpose of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

A TV screen may comprise a touch screen for selection control of a set top box or TV channels, alternatively a computer screen may comprise a touch screen for selection control of Internet homepages, or preferably a WebPad may comprise a touch screen for selection control of Internet homepages.

Figure 1:
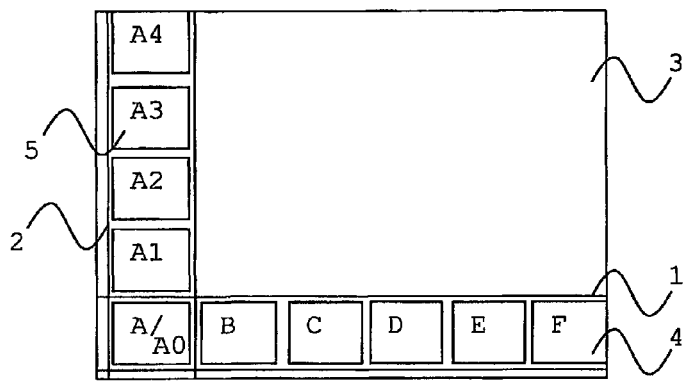
FIG. 1 shows an overview of intersected bars on a touch screen according to a first embodiment of the present invention.

A first embodiment of the invention will now be described with reference to FIG. 1. A first and a second intersecting bar 1, 2 are displayed on a touch screen 3. The bars are preferably displayed near the edge of the screen in order to block as little of the screen as possible. The screen may e.g. display a TV program or an Internet homepage in the background, which preferably should be presented as visually as possible. The first bar 1 displays a number of containers A, B, . . . , F containing objects. The second bar 2 displays a number of objects A0, A1, . . . , A4 contained in the container at the intersection of the bars, i.e. container A.

An object in the second bar 2 is activated by one touch on that object. This may for instance be an event such as switching TV channels, access of a homepage on the Internet, or a selection of background colour of the screen.

It is possible to allow further levels than just two: container and object. Activation of an object may display sub-objects in a third bar, which then preferably replaces the first bar. In this way the screen is not blocked more than with only two bars.

Objects displayed in the second bar 2 are replaced by one touch on a container other than A in the first bar 1. Then, said other container moves to the intersection of the bars, and therewith the objects contained in said other container are displayed in the second bar. The containers may preferably keep the relative order after said other container has moved to the intersection of the bars, but alternatively said other container may switch places with container A.

The first bar 1 may be displayed near the lower edge of the screen and the second bar 2 may be displayed near the left edge of the screen. As shown, the angle between the bars is 90 degrees, but it is possible to display the bars with another relative angle. In this case the intersection is in the lower left corner of the screen. It is also possible to display the bars 1, 2 at other combinations along the edges of the screen. It is further possible to display the bars with the intersection at other locations than in a corner of the screen, e.g. in the middle of the screen. But as the middle of a screen usually displays the most important information the bars are preferably displayed along the edges of the screen.

Figure 2:
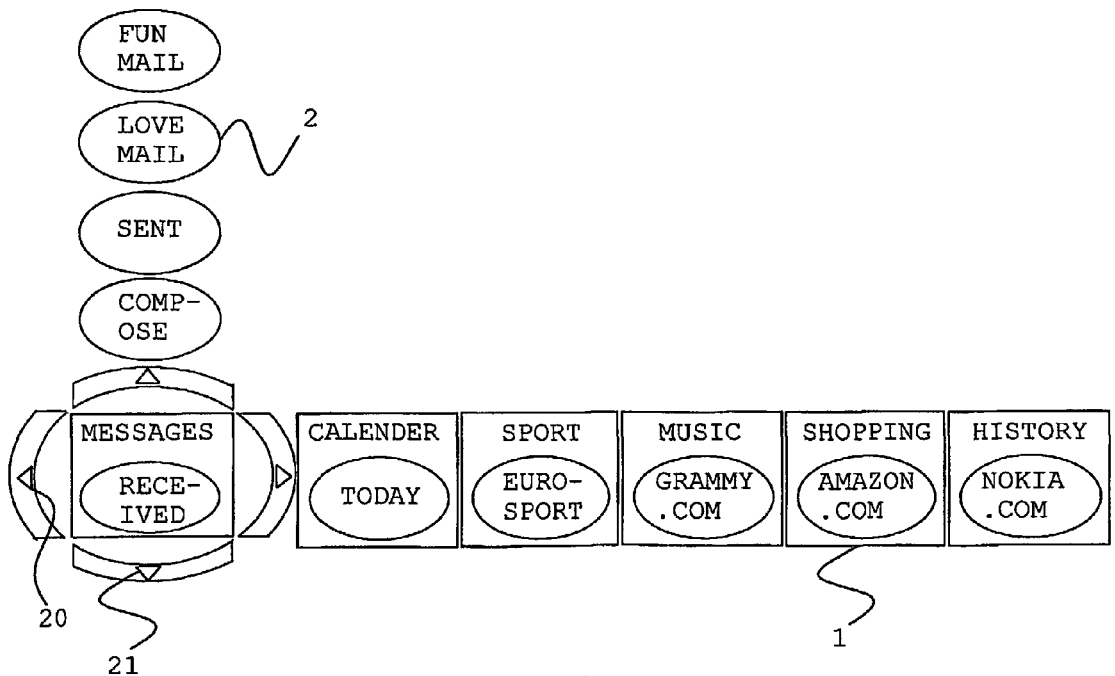
FIG. 2 shows intersected bars with markers according to a second embodiment of the present invention.

A second embodiment will now be described with reference to FIG. 2. In case there are more containers to display than there is space for on the screen, a marker, e.g. an arrow 20, is displayed at an end of the first bar 1. A touch on the marker scrolls the containers in the first bar 1, which makes it possible to select each container. Similarly, if there are more objects than there is space for on the screen, another marker 21 is displayed at an end of the second bar 2 to make it possible to scroll through the objects. It is also possible to display a marker at both ends of a bar to make it possible to scroll that bar in two directions. It is further possible to display markers at the intersection of the bars as seen in FIG. 2. It is yet further possible to display markers even when not necessary, i.e. when all containers or all objects could be shown on the screen. By showing markers even when not necessary the user recognises the look of the displayed bars, which facilitate for the user to recognise the interface.

Normally the intersected bars 1, 2 are not shown on the screen 3. A touch on the screen, or on a key on a console, if such a console is provided, activates the intersecting bars and therewith they are displayed on the screen. After that an object has been activated the bars are made to disappear from the screen, with the exception that the activation of sub-objects does not make the bars to disappear.

Figure 3:
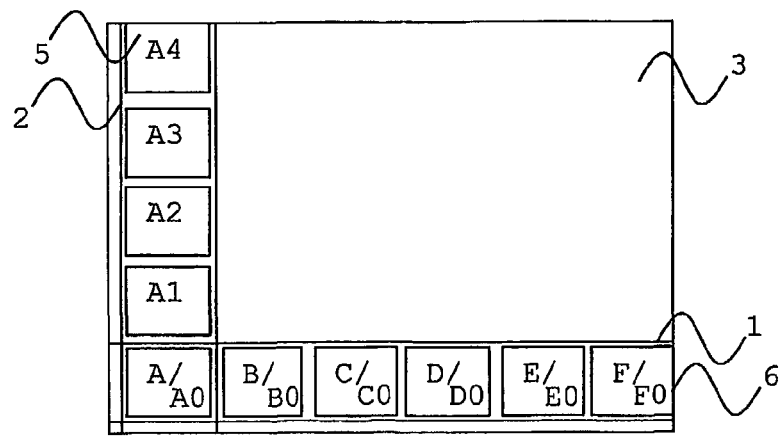
FIG. 3 shows an overview of intersected bars on a touch screen according to a third embodiment of the present invention.

A third embodiment of the present invention will now be described with reference to FIG. 3, wherein each container 6 in the first bar 1 displays one object directly A0, B0, . . . , F0, i.e. even when not being located in the intersection with the second bar 2. In this embodiment it is possible to activate an object A0, B0, . . . , F0 directly in the first bar 1. Each container 6 in the first bar 1 comprise two fields; one touch on an object in the respective container activates that object, preferably with a visualisation that first moves that container to the intersection of the bars and then activating the selected object; one touch on a container moves that container to the intersection of the bars, and therewith the second bar displays the objects contained in that container. The visualisation in connection with activated objects in the first bar is preferably used to make it feasible for the user to understand what has happened.

The objects displayed in the first bar may be selected in several ways. One option is to display the object last activated in the respective container. Another option is to display the most frequently activated object. A third option is to display an object pre-selected by the user.

One way of making it possible to configure the bars is by employment of two touches, a so called double touch, on an object, on a container, or anywhere on the screen open a dialog box for configuration of that object, that container, or a general configuration. To distinguish a double touch from a single touch, it is necessary that the two touches are performed within a predetermined period. Preferably the two touches should be performed within a second, or more preferably within half a second, since effectuation of a single touch has to wait until a time corresponding to the time allowable between the touches in a double touch, i.e. after detection of a touch and a time equivalent to the allowable time between the touches the effect of the single touch is effectuated.

A touch on a touch screen may be detected as a touch when a touch device, e.g. a finger or a touch pen, is lifted from the screen, a so-called finger up. A way of making it possible for a user to arrange or rearrange the objects or containers is by a drag and drop technique, i.e. when touching (keeping the touch device down, i.e. a so-called finger down) on an object or a container it is possible to move that object or container to a different position, e.g. to a different container or different position among the containers. It is further possible to drag e.g. an Internet address from an event of the visible part of the screen and drop it, and thereby creating an object in the form of a bookmark, in a container.

In order to block as little as possible of the screen an alternative way of displaying the bars may be to display the bars semi transparent, i.e. no distinguishing background is utilized.

Figure 4:
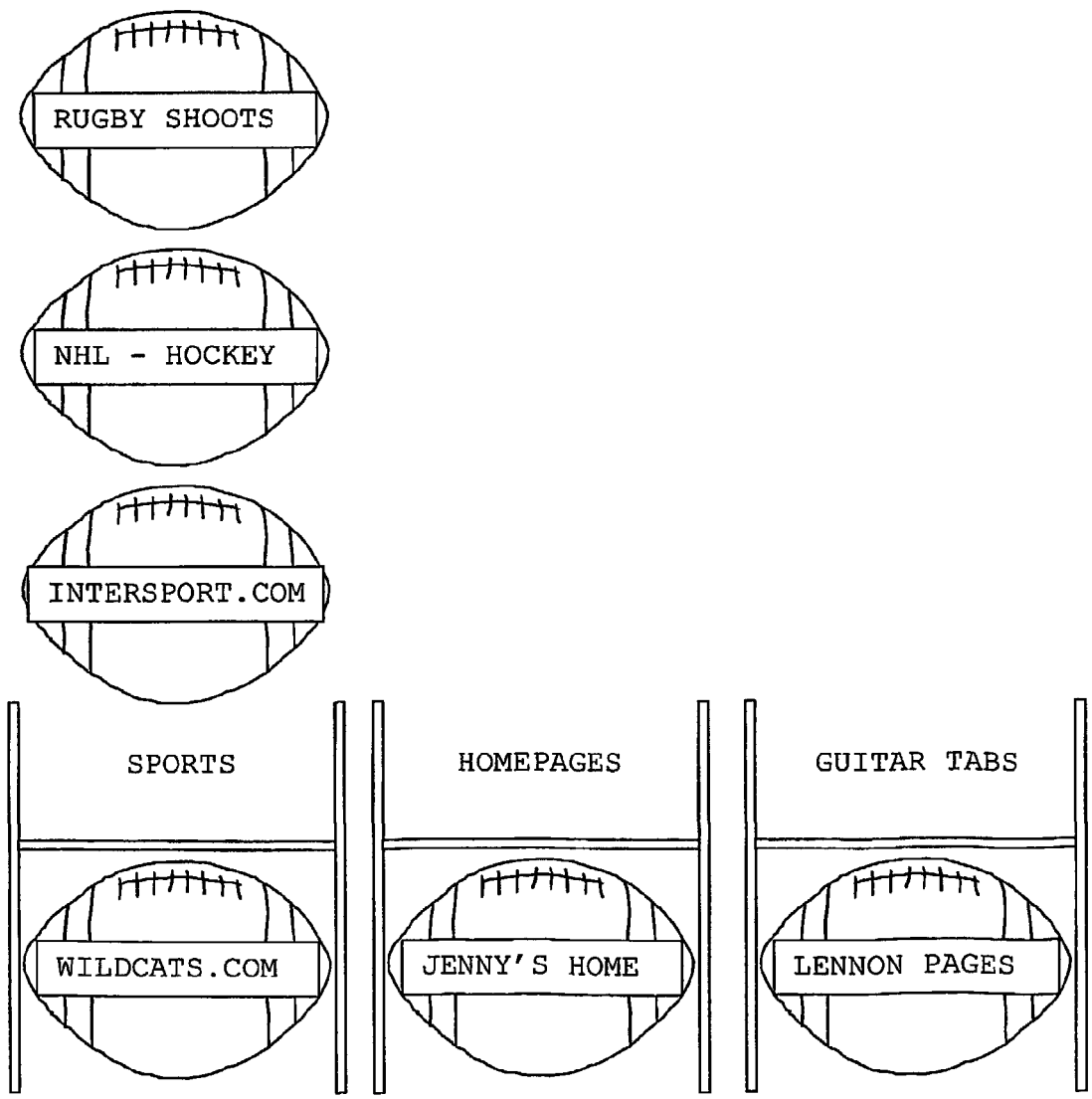
FIG. 4 shows intersected bars with integrated symbols.
Figure 5:
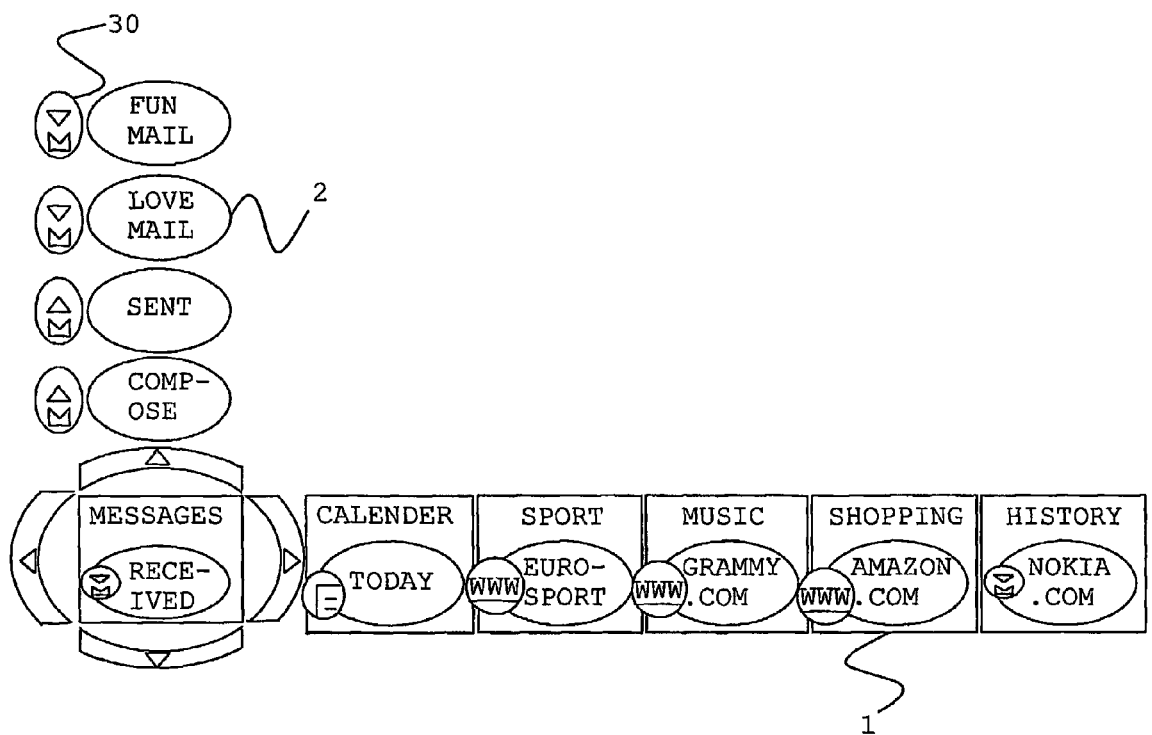
FIG. 5 shows intersected bars with attached symbols.
Figure 6:
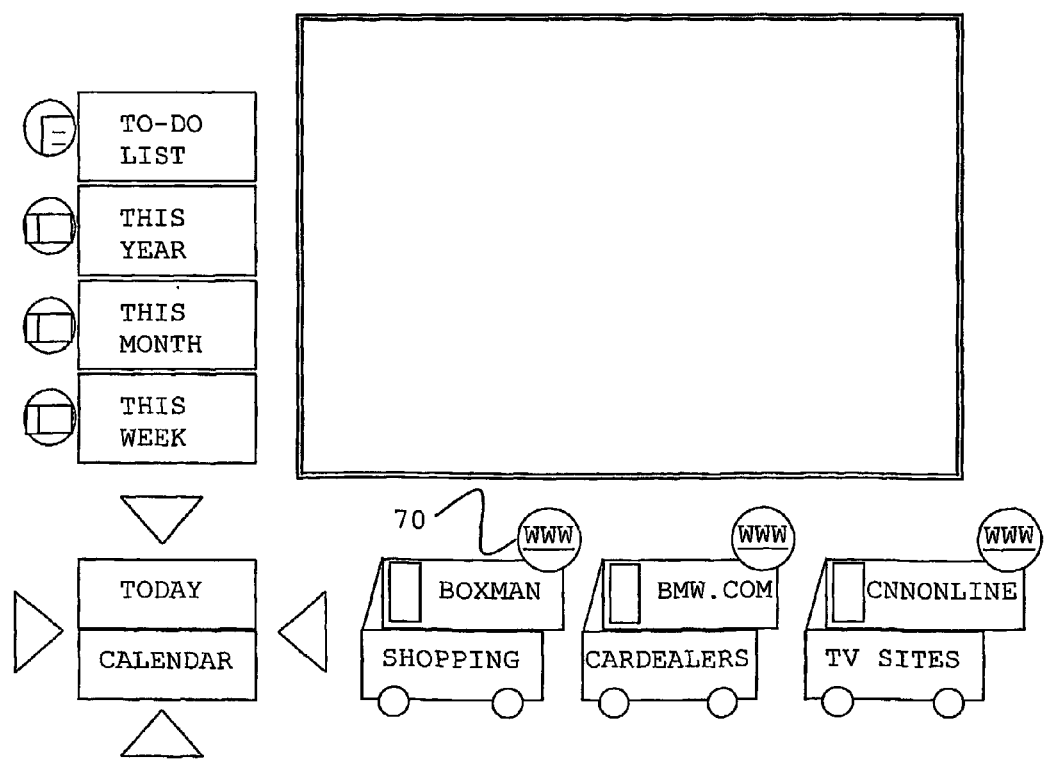
FIG. 6 shows an overview of a screen with intersected bars displayed.

To further facilitate for the user to select a container or object the container or object may be visualised as a symbol representing the container or the object, see e.g. FIG. 4. For instance, the symbol may be a football for a sports container, an Internet figurehead for homepages or a TV screen for TV channels. The symbol may further be a preview of the object, i.e. a miniature still picture of a TV program or miniature of a homepage. The symbol may also be attached, as 30 in FIG. 5, to an object and alternatively further show the characteristic of the object, as 70 in FIG. 6. This facilitates for the user to detect an object or a container with a quick visual overview.

A way to detect a selection to display additional information of a container or an object is to move a touch device, e.g. a finger or a touch pen, over that container or object without lifting the touch device from the screen, i.e. a so-called finger over.

Figure 7:
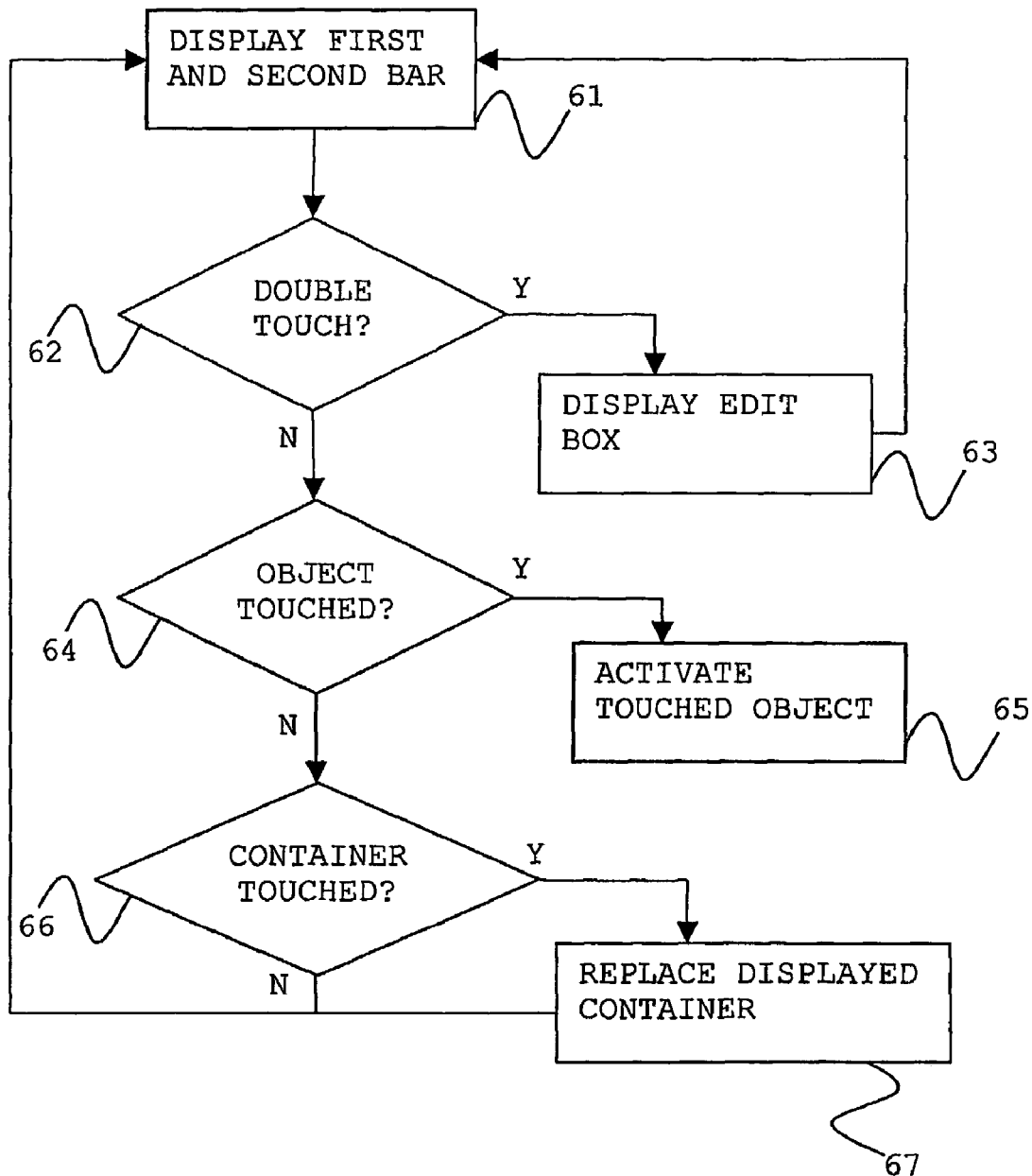
FIG. 7 is a block diagram depicting a method according to the present invention.

A method for selection control by use of a touch screen will now be described with reference to FIG. 7. After activation, e.g. a touch on the touch screen, a first and a second intersecting bar are displayed 61 on the screen. If an object is touched 64 that object is activated 65 and the bars are made to disappear, and else if a container is touched 66 that container is put 67 in the intersection of the bars and the selected bars are displayed 61.

An additional feature is to detect 62 after the bars are displayed 61 on the screen, if a double touch is performed and therewith display 63 an edit box for configuration of the interface. If only a single touch is detected, as described above, the method operates as described above.

An alternative feature is to make the intersected bars disappear after a predetermined period, e.g. one minute, without detection of a touch.

Preferably, the present invention is run on a computer with an internal memory, with software code that performs the features described above.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. A method for selection control using a touch screen, the method comprising the steps of:
    displaying first and second intersecting bars, wherein the first bar displays containers and the second bar displays objects contained in a container in an intersection of the bars; and
    activating a selected object in the second bar by one touch on said selected object, or
    moving a container different than the container in the intersection of the bars, to the intersection of the bars, by one touch on the different container thereby replacing objects displayed in the second bar by other objects contained in the different container, and activation of a selected object in the second bar by one touch on said selected object.

2. The method as claimed in claim 1, wherein each container in the first bar comprises two fields, of which one displays a predetermined object in each respective container and a further selection comprises
    activating a predetermined object in the first bar by one touch on that object, or
    moving a container in the first bar to the intersection of the bars by one touch on the other field of that container.

3. The method as claimed in claim 2, wherein the object displayed in each respective container in the first bar shows the latest activated object of each respective container.

4. The method as claimed in claim 2, wherein the object displayed in each respective container in the first bar shows the most frequently activated object of each respective container.

5. The method as claimed in claim 2, wherein said activation of a selected object in the first bar first puts the container containing that object in the intersection of the bars and then activates that object.

6. The method of any previous claim, wherein each object is shown as preview of a respective event the object corresponds to.

7. The method as claimed in any of claims 1, 2, 3, 4 or 5, wherein each object is shown as a symbol representing the container in which it is contained in the first bar.

8. The method as claimed in any previous claim 1, 2, 3, 4 or 5, wherein the bars are semi transparent.

9. The method as claimed in any previous claim 1, 2, 3, 4 or 5, further displaying markers for scrolling the bars.

10. The method of claim 9, wherein said markers are displayed at the intersection of the bars.

11. The method as claimed in any previous claim 1, 2, 3, 4 or 5, wherein activation of a selected object changes TV channel, or downloads an Internet homepage.

12. The method as claimed in claim 1, wherein activation of a selected object displays sub-objects in a further bar, which replaces the first bar.

13. The method as claimed in claim 1, wherein the bars are displayed near a respective edge of the screen.

14. An apparatus for selection control by means of a touch screen, the apparatus comprising:
    a display of first and second intersecting bars on the screen, the first bar displaying containers and the second bar displaying objects contained in a container in an intersection of the bars,
    the apparatus being arranged to upon detection of a touch on an object in the second bar activate that object, or upon detection of a touch on a container in the first bar move that container to the intersection of the bars, thereby replacing objects displayed in the second bar by other objects contained in that container.

15. The apparatus as claimed in claim 14, wherein each container in the first bar displays an object, and the apparatus further upon detection of a touch on object displayed in the first bar activates that object.

16. The apparatus as claimed in claim 15, wherein the object displayed in each respective container in the first bar shows the latest activated object of each respective container.

17. The apparatus as claimed in claim 15, wherein the object displayed in each respective container in the first bar shows the most frequently activated object of each respective container.

18. The apparatus as claimed in claim 15, wherein said detection of a touch on an object in the first bar first put the container containing that object in the intersection of the bars and then activates that object.

19. The apparatus as claimed in any of claims 14, 15, 16, 17 or 18, wherein each object is shown as a preview of the respective event the object corresponds to.

20. The apparatus as claimed in any of claims 14, 15, 16, 17 or 18, wherein each object is shown as a symbol representing the container in which it is contained in the first bar.

21. The apparatus as claimed in any of claims 14, 15, 16, 17 or 18, wherein the bars are semi transparent.

22. The apparatus as claimed in any of claims 14, 15, 16, 17 or 18, wherein the apparatus further displays markers for scrolling the bars.

23. The apparatus as claimed in claim 22, wherein said markers are displayed at the intersection of the bars.

24. The apparatus as claimed in any of claims 14, 15, 16, 17 or 18, wherein the bars are displayed near the edge of the screen.

25. A computer program product directly loadable into the internal memory of a computer, said computer program product comprising software code portions for performing the method as claimed in claim 1, when the product is run on the computer.

26. A portable media browsing device, including an apparatus as claimed in claim 14.

* * * * *